US010112245B2

(12) United States Patent
Hunter et al.

(10) Patent No.: US 10,112,245 B2
(45) Date of Patent: Oct. 30, 2018

(54) BAND SAW BLADE

(71) Applicant: Irwin Industrial Tool Company, Huntersville, NC (US)

(72) Inventors: Matthew Hunter, Hatfield, MA (US); Mark T Cranna, Somers, CT (US)

(73) Assignee: Irwin Industrial Tool Company, Huntersville, NC (US)

( * ) Notice: Subject to any disclaimer, the term of this patent is extended or adjusted under 35 U.S.C. 154(b) by 67 days.

(21) Appl. No.: 14/691,471

(22) Filed: Apr. 20, 2015

(65) Prior Publication Data
US 2016/0303671 A1 Oct. 20, 2016

(51) Int. Cl.
*B23D 61/12* (2006.01)

(52) U.S. Cl.
CPC ........... *B23D 61/123* (2013.01); *B23D 61/12* (2013.01)

(58) Field of Classification Search
CPC .... B23D 61/12; B23D 61/121; B23D 61/123; B23D 61/127; B23D 61/14; B23D 61/021; Y10T 83/935; Y10T 83/9355; Y10T 83/9358; Y10T 83/9346
See application file for complete search history.

(56) References Cited

U.S. PATENT DOCUMENTS

| 3,736,828 | A |   | 6/1973 | Funakubo |   |
|---|---|---|---|---|---|
| 4,292,871 | A | * | 10/1981 | Neumeyer | B23D 61/12 |
|   |   |   |   |   | 76/112 |
| 4,784,033 | A |   | 11/1988 | Hayden et al. |   |
| 5,477,763 | A |   | 12/1995 | Kullman |   |
| 6,276,248 | B1 | * | 8/2001 | Cranna | B23D 61/121 |
|   |   |   |   |   | 83/846 |
| 6,601,495 | B2 |   | 8/2003 | Cranna |   |
| 6,681,674 | B2 |   | 1/2004 | Hakansson et al. |   |
| 6,931,975 | B2 |   | 8/2005 | Haughton et al. |   |
| 7,036,415 | B2 | * | 5/2006 | Tsujimoto | B23D 61/121 |
|   |   |   |   |   | 83/661 |
| 8,210,081 | B2 |   | 7/2012 | Elliston et al. |   |
| 2002/0029679 | A1 | * | 3/2002 | Cranna | B23D 61/121 |
|   |   |   |   |   | 83/846 |
| 2004/0182218 | A1 |   | 9/2004 | Chao |   |
| 2005/0056135 | A1 | * | 3/2005 | Hall | B23D 61/121 |
|   |   |   |   |   | 83/851 |
| 2006/0065098 | A1 | * | 3/2006 | Cranna | B23D 61/121 |
|   |   |   |   |   | 83/661 |

(Continued)

*Primary Examiner* — Jennifer Swinney
(74) *Attorney, Agent, or Firm* — Eversheds Sutherland (US) LLP

(57) ABSTRACT

A bimetal band saw blade has a cutting edge with a plurality of cutting teeth defining repeating, variable pitch patterns and variable set patterns within pitch patterns. Each relatively heavy set tooth defines a first primary clearance angle, and each unset and relatively light set tooth defines a second primary clearance angle. Each first primary clearance angle is less than or equal to about 20°, each second primary clearance angle is less than or equal to about 25°, and each first primary clearance angle is within the range of about 4° to about 6° less than each second primary clearance angle. Each unset or light set tooth defines a greater gullet area than a respective heavy set tooth and/or a finer pitch than the respective heavy set tooth. Each tooth defines a positive rake angle within the range of about 3° to about 10°.

23 Claims, 7 Drawing Sheets

(56) References Cited

U.S. PATENT DOCUMENTS

| | | | |
|---|---|---|---|
| 2008/0307936 A1* | 12/2008 | Elliston | B23D 61/121 83/13 |
| 2011/0154970 A1* | 6/2011 | Oshibe | B23D 61/121 83/835 |
| 2011/0271815 A1 | 11/2011 | Elliston et al. | |
| 2012/0000338 A1* | 1/2012 | Elliston | B23D 61/121 83/848 |
| 2012/0017742 A1 | 1/2012 | Balint | |
| 2013/0032014 A1 | 2/2013 | Elliston et al. | |
| 2013/0133500 A1* | 5/2013 | Horiguchi | B23D 61/121 83/661 |
| 2013/0149059 A1* | 6/2013 | Cranna | B23D 61/121 408/204 |
| 2013/0180375 A1* | 7/2013 | Rearick | B23D 61/121 83/849 |
| 2014/0069246 A1 | 3/2014 | Moehringer | |

* cited by examiner

| Tooth No. | Tooth Type | Rake Angle (42) | 5/8 TPI PCA (40₁ or 40₂) | 5/8 TPI PITCH (P1-P10) | 5/8 TPI GULLET AREA (GA) | 6/10 TPI PCA | 6/10 TPI PITCH (P1-P10) | 6/10 TPI GULLET AREA (GA) | 10/14 TPI PCA | 10/14 TPI PITCH (P1-P10) | 10/14 GULLET AREA (GA) |
|---|---|---|---|---|---|---|---|---|---|---|---|
| 1 | S | 8° | 15° | 5.1 | 0.00745 in² | 18° | 6.4 | 0.00535 in² | 24° | 10.5 | 0.00228 in² |
| 2 | R | 8° | 15° | 5.3 | 0.00700 in² | 18° | 6.9 | 0.00464 in² | 24° | 11.0 | 0.00216 in² |
| 3 | L(h) | 8° | 9° | 5.6 | 0.00581 in² | 12° | 7.5 | 0.00387 in² | 19° | 11.8 | 0.00181 in² |
| 4 | R(h) | 8° | 9° | 5.8 | 0.00539 in² | 12° | 8.1 | 0.00341 in² | 19° | 12.2 | 0.00165 in² |
| 5 | L | 8° | 15° | 6.1 | 0.00551 in² | 18° | 8.9 | 0.00300 in² | 24° | 13.3 | 0.00153 in² |
| 6 | S | 8° | 15° | 6.5 | 0.00481 in² | 18° | 10.0 | 0.00239 in² | 24° | 13.8 | 0.00138 in² |
| 7 | R | 8° | 15° | 6.0 | 0.00556 in² | 18° | 8.5 | 0.00332 in² | 24° | 12.2 | 0.00179 in² |
| 8 | L(h) | 8° | 9° | 5.6 | 0.00581 in² | 12° | 7.6 | 0.00383 in² | 19° | 11.2 | 0.00200 in² |
| 9 | R(h) | 8° | 9° | 5.2 | 0.00684 in² | 12° | 6.7 | 0.00478 in² | 19° | 10.2 | 0.00233 in² |
| 10 | L | 8° | 15° | 4.9 | 0.00735 in² | 18° | 6.0 | 0.00610 in² | 24° | 9.6 | 0.00277 in² |

*FIG. 4*

|  | 1 | 2 | 3 | 4 | 5 |
|---|---|---|---|---|---|
| Pitch (Actual) | 6/8 (6.02/ 7.87) | 5/8 (4.93/ 6.45) | 5/7 (4.71/ 6.59) | 5/8 (4.93/ 6.45) | 5/8 (4.93/ 6.45) |
| Average D/P | 40.6% | 40.2% | 37.4% | 37.70% | 37.70% |
| Rake/ P.Relief | 5°/ 30° | 5°/ 30° | 8.8°/ 19.1° | 8°/ 15(9)° | 8°/ 15(9)° |
| Min Band Width | 0.997 | 0.987 | 0.975 | 0.993 | 0.993 |
| Tooth Pattern | 7T: (Gullet) S, R, L, R, L, R, L | 7T: (Gullet) S, R, L, R, L, R, L | 8T: S, L(h), R(h), (Gullet) S, L(h), R(h), L, R | 10T: Gullet S, R, L(h), R(h), L, S, R, L(h), R(h), L | 10T: Gullet S, R, L(h), R(h), L, S, R, L(h), R(h), L |
| Side Set | 0.0115 | 0.0115 | 0.007 ±0.000, 0.014 ±0.001(h) | 0.0115/ 0.0055 | 0.009/ 0.006 |

*FIG. 7*

BAND SAW BLADE

FIELD OF THE INVENTION

The present invention relates to saw blades, and more particularly, to band saw blades where the cutting teeth define variable clearance angles and variable set patterns within variable pitch patterns.

BACKGROUND INFORMATION

In a typical manual "pull-down" band saw the force at which the band saw blade is fed into the work piece is not mechanically controlled, but rather is provided manually by the operator. As a result, the feed force is limited and can vary depending on the physical strength and ability of the operator. Such pull-down band saws can be used to cut metal work pieces including, for example, roll formed, structural shapes, such as metal pipes, fence posts, and other metal work pieces defining unique or odd shaped profiles. The band saw blades used for such applications are typically bi-metal with flexible, spring steel backings, and cutting teeth with tool steel tips that are welded to the spring steel backings. Due to the relatively uncontrolled nature of the feed force in manual pull-down band saws, relatively high impact cutting forces can be imparted to the cutting teeth, particularly when cutting metal, structural work pieces. As a result, a primary failure mode of band saw blades used in such applications is tooth damage due to chipping at the tool steel tips and/or stripping of the teeth away from the band at the bi-metal weld region or interface.

One of the drawbacks of prior art band saw blades used in such applications is that the blades fail prematurely, particularly as a result of the above-mentioned tooth chipping and/or stripping, and therefore the blades do not provide as long a blade life as desired. Another drawback is that the band saw blades do not use the manually-supplied feed forces as efficiently as desired, and as a result, the time required to cut through work pieces can be longer than desired. Commercially available band saw blades utilize a variety of methodologies to provide more robust tooth forms and thereby increase blade life. A first methodology utilizes neutral or relatively small rake angles to maximize the included angle between the rake face and clearance surfaces of the teeth. A second methodology utilizes a somewhat reduced primary clearance angle in conjunction with a larger secondary clearance angle to maximize the included angle. A third methodology utilizes a significantly reduced primary clearance angle in conjunction with a larger secondary clearance angle to maximize the included angle.

The present inventor has determined that these methodologies have achieved varying and limited levels of effectiveness. The first methodology can cause the cutting to be less efficient than desired while allowing for only relatively minimal gains in resisting tooth strippage. The second methodology, on the other hand, can be more effective at reducing tooth strippage, but can require longer cutting times than desired. The third methodology also can be effective at reducing tooth stripping and chipping, but the tooth form defines relatively small gullets that become more easily filled with chips. This can reduce the rate at which the band saw is fed into the work piece, can cause the blade to stall and/or can lead to crooked cutting.

It is an object of the present invention to overcome one or more of the above-described drawbacks and/or disadvantages of the prior art.

SUMMARY OF THE INVENTION

In accordance with one aspect, the present invention is directed to a bimetal band saw blade with a cutting edge including a plurality of cutting teeth defining repeating pitch patterns and set patterns within pitch patterns. Each set pattern includes at least one unset or relatively light set tooth, and at least one relatively heavy set tooth. A plurality of teeth within each pitch pattern define different pitches than a plurality of other teeth within the pitch pattern. Each relatively heavy set tooth defines a first primary clearance angle, and each unset and relatively light set tooth defines a second primary clearance angle. Each first primary clearance angle is less than or equal to about 20°, each second primary clearance angle is less than or equal to about 25°, and each first primary clearance angle is within the range of about 4° to about 6° less than each second primary clearance angle. Each unset or light set tooth defines (a) a greater gullet area than a respective heavy set tooth, and/or (b) a finer pitch than the respective heavy set tooth. Each tooth defines a positive rake angle within the range of about 3° to about 10°.

In some embodiments of the present invention, each tooth defines a positive rake angle that is greater than about 4°, is preferably greater than about 6°, and is more preferably greater than about 7°.

In some embodiments of the present invention, the band saw blade comprises a blade body, and each set tooth defines a set equal to the distance between an outer edge of the tooth and an adjacent side of an unset tooth or the blade body. Each light set tooth defines a set within the range of about 0.005 inch to about 0.007 inch, and preferably a set of about 0.006 inch, and each heavy set tooth defines a set within the range of about 0.008 inch to about 0.010 inch, and preferably a set of about 0.009 inch.

In some embodiments of the present invention, the band saw blade defines a cutting direction, and each pitch pattern comprises teeth that decrease in pitch in a direction opposite the cutting direction, from a relatively coarse pitch to a relatively fine pitch, and then increase in pitch from the relatively fine pitch to a relatively coarse pitch. In some such embodiments, each pitch pattern consists of teeth that progressively decrease in pitch from one tooth to the next from a relatively coarse pitch to a relatively fine pitch, and then progressively increase in pitch from one tooth to the next from the relatively fine pitch to the relatively coarse pitch.

In some embodiments of the present invention, (i) each pitch pattern defines a variable pitch within the range of about 5 teeth per inch ("TPI") to about 8 TPI, the first primary clearance angle is within the range of about 7° to about 11°, and is preferably about 9°, and the second primary clearance angle is within the range of about 13° to about 17°, and is preferably about 15°; (ii) each pitch pattern defines a variable pitch within the range of about 6 TPI to about 10 TPI, the first primary clearance angle is within the range of about 10° to about 14°, and is preferably about 12°, and the second primary clearance angle is within the range of about 16° to about 20°, and is preferably about 18°; or (iii) each pitch pattern defines a variable pitch within the range of about 10 TPI to about 14 TPI, the first primary clearance angle is within the range of about 17° to about 21°, and is preferably about 19°, and the second primary clearance angle is within the range of about 22° to about 25°, and is preferably about 24°.

In some embodiments of the present invention, the band saw blade defines a cutting direction, and the gullet areas of the teeth in each pitch pattern decrease in a direction opposite the cutting direction from a relatively high gullet area at one end of the pitch pattern to a relatively low gullet area in a midsection of the pitch pattern, and then increase from the relatively low gullet area to a relatively high gullet area at the other end of the pitch pattern. In some such embodiments, the gullet areas of the teeth in each pitch pattern progressively decrease from one tooth to the next in a direction opposite the cutting direction from the relatively high gullet area at one end of the pitch pattern to the relatively low gullet area at the midsection of the pitch pattern, and then progressively increase in pitch from one tooth to the next from the relatively low gullet area to the relatively high gullet area at the other end of the pitch pattern.

In some embodiments of the present invention, a plurality of teeth in a midsection of each pitch pattern define (i) the finest pitches of the pitch pattern, and/or (ii) the smallest gullet areas of the pitch pattern. In some such embodiments, each pitch pattern includes about ten teeth, and about three of the teeth at the midsection of the pitch pattern define (i) the finest pitches of the pitch pattern, and/or (ii) the smallest gullet areas of the pitch pattern. In some such embodiments, each of the three teeth at the midsection are either unset or light set teeth. In some embodiments of the present invention, the tooth in each pitch pattern defining (i) the smallest gullet area and/or (ii) the finest pitch, is an unset tooth located in the midsection of the pitch pattern.

In some embodiments of the present invention, at least one unset or light set tooth defines a lesser gullet area and a finer pitch than a respective heavy set tooth. In some such embodiments, said at least one unset or light set tooth is located in a midsection of the respective pitch pattern. In some such embodiments, each of said at least one unset or light set teeth defines a gullet area that is not less than about 60 percent of the gullet area of any heavy set tooth. In some embodiments, each of said at least one unset or light set teeth defines a gullet area that is within the range of about 50 percent to about 90 percent of the gullet area of any heavy set tooth.

In some embodiments of the present invention, each pitch pattern defines a total gullet area for all teeth within the respective pitch pattern, and the total gullet area of all heavy set teeth (i) is less than about 45% of the total gullet area for all teeth in the respective pitch pattern, and (ii) is preferably less than about 40% of the total gullet area for all teeth in the respective pitch pattern. Also in some embodiments the gullet area of each heavy set tooth is no more than about 12% of the total gullet area of all teeth in the respective pitch pattern, and preferably is no more than about 9% of the total gullet area of all teeth within the respective pitch pattern.

In some embodiments, the band saw blade defines a cutting direction, and the plurality of teeth define set patterns within each pitch pattern. Within each set pattern the teeth (i) increase in set in a direction opposite the cutting direction from an unset tooth to a light set tooth to a heavy set tooth, and then (ii) decrease in set from a heavy set tooth to a light set tooth to an unset tooth. In some such embodiments, within each set pattern the teeth (i) increase again from the unset tooth to a light set tooth to another heavy set tooth, and (ii) decrease again from a heavy set tooth to a light set tooth to another unset tooth. In some embodiments, each set pattern includes an unset or light set tooth followed in a direction opposite the cutting direction by a light set tooth, a heavy set tooth, and then an unset or light set tooth. In some such embodiments, the set pattern is repeated within the pitch pattern. In some such embodiments, the teeth of the repeating set pattern within the pitch pattern comprise an unset tooth followed in a direction opposite the cutting direction by a light set tooth set to a first side of the blade body, a heavy set tooth set to a second side of the blade body opposite the first side, a heavy set tooth set to the first side, a light set tooth set to the second side, an unset tooth or light set tooth, a light set tooth set to the first side, a heavy set tooth set to the second side, a heavy set tooth set to the first side, and an unset or light set tooth.

Some embodiments of the present invention further comprise a blade body including a relatively flexible backing, such as a spring steel backing, a relatively hard portion, such as tool steel, defining the tips of the cutting teeth and welded to the backing, and a weld region therebetween where the hard portion is welded to the flexible backing. Each tooth includes a cutting tip, a gullet extending between the tooth and an adjacent tooth, a protrusion located at the weld region between the gullet and the tip, and a rake face extending between the protrusion and the cutting tip. The protrusion extends outwardly relative to contiguous portions of the rake face and gullet.

In accordance with another aspect, the present invention is directed to a bimetal band saw blade with a cutting edge including a plurality of cutting teeth defining repeating pitch patterns and set patterns within pitch patterns. At least one set pattern includes at least one unset or relatively light set tooth, and at least one relatively heavy set tooth. A plurality of teeth within the pitch pattern define different pitches than a plurality of other teeth within the pitch pattern. Each relatively heavy set tooth defines a first primary clearance angle, and each unset and relatively light set tooth defines a second primary clearance angle. Each tooth defines a positive rake angle within the range of about 3° to about 10°. Each tooth includes (i) first means for preventing tooth chipping and stripping; and (ii) second means for preventing gullet overfill and associated blade stall and crooked cutting.

In some embodiments of the present invention, the first means is defined by each first primary clearance angle being within the range of about 4° to about 6° less than each second primary clearance angle, and each second primary clearance angle being less than or equal to about 25°. In some embodiments, the second means is defined by each unset or light set tooth defining at least one of (a) a greater gullet area than a respective heavy set tooth, and (b) a finer pitch than the respective heavy set tooth.

One advantage of the present invention is that the first primary clearance angles of the heavy set teeth are less than or equal to about 20°. This feature provides relatively large included angles between the primary clearance angles and rake faces of the heavy set teeth, and thereby provides a robust tooth form, including a relatively long bimetal weld interface, in the cutting teeth that encounter the most substantial cutting forces. This, in turn, provides significantly improved resistance to the premature tooth stripping and chipping encountered in prior art band saw blades. Yet another advantage of the present invention is that the second primary clearance angles of the unset and light set teeth are less than or equal to about 25°. Although greater than the first primary clearance angles, the second primary clearance angles are nevertheless relatively shallow, providing for relatively large included angles between the primary clearance angles and rake faces of the unset and light set teeth, and thereby providing a robust tooth form, including a relatively long bimetal weld interface. This feature further contributes to providing significantly improved resistance to the premature tooth stripping and chipping encountered in prior art band saw blades.

Another advantage of the present invention is that each unset and light set tooth defines a greater gullet area than a respective heavy set tooth and/or a finer pitch than the respective heavy set tooth. The unset and light set teeth in each pitch pattern thus define a greater gullet capacity than the heavy set teeth in the pitch pattern, thereby providing substantially improved resistance to gullet overfill, and substantially obviating the associated high manual feed forces, reduced feed rates, blade stalling, and/or crooked cutting encountered in prior art band saw blades. Yet another advantage of this feature is that it can allow for significantly faster cutting times in comparison to prior art band saw blades, particularly when cutting structural shapes, such as structural, roll-formed metal work pieces.

A further advantage of embodiments of the band saw blades of the present invention is that each tooth defines a positive rake angle within the range of about 3° to about 10°, and which is preferably greater than about 4°, is more preferably greater than about 6°, and is even more preferably greater than about 7°. The relatively large included angles resulting from the shallow primary clearance angles allow for such aggressive rake angles, without significantly impacting the robustness of the tooth form, and thus without significantly impacting the resistance of the teeth to the stripping and chipping encountered in prior art band saw blades. On the other hand, the relatively aggressive rake angles contribute to achieving faster cutting times in comparison to prior art band saw blades, particularly in manual pull-down band saws, such as when cutting structural, metal work pieces.

Accordingly, another advantage of the band saw blades of the present invention is that they balance toughness against cutting speed, where toughness is achieved with relatively shallow primary clearance angles, and cutting speed is achieved with increased overall gullet capacity of the unset and light set teeth as compared to the heavy set teeth, and with aggressive rake angles for all teeth or substantially all teeth.

Another advantage of some embodiments of the present invention is that the light and heavy set teeth are set to a lesser degree than the light and heavy set teeth, respectively, of prior art band saw blades. More specifically, each light set tooth defines a set within the range of about 0.005 inch to about 0.007 inch, and each heavy set tooth defines a set within the range of about 0.008 inch to about 0.010 inch. The lesser degree of set imparts a relatively narrow kerf width to the work pieces in comparison to prior art band saw blades, which, in turn, contributes to more efficient cutting and significantly faster cutting times in comparison to prior art band saw blades, particularly when cutting structural shapes, such as structural, roll-formed metal work pieces.

Other objects and advantages of the present invention, and/or of the currently preferred embodiments thereof, will become more readily apparent in view of the following detailed description of embodiments and accompanying drawings.

BRIEF DESCRIPTION OF THE DRAWINGS

FIG. 4 is a table illustrating dimensions and other features of band saw blades in accordance with three variable pitch embodiments of the present invention;

FIG. 7 is a table summarizing the features of the tested band saw blades of FIGS. 5 and 6.

DETAILED DESCRIPTION OF EMBODIMENTS OF THE INVENTION

Figure 1:
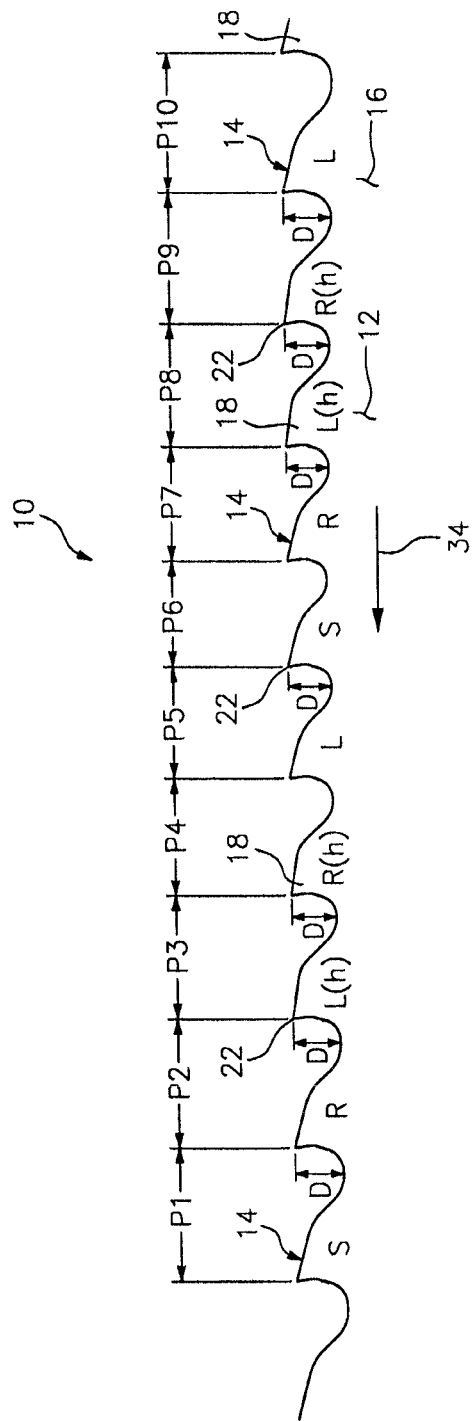
FIG. 1 is a partial, side elevational view of a band saw blade in accordance with an embodiment of the present invention.
Figure 2:
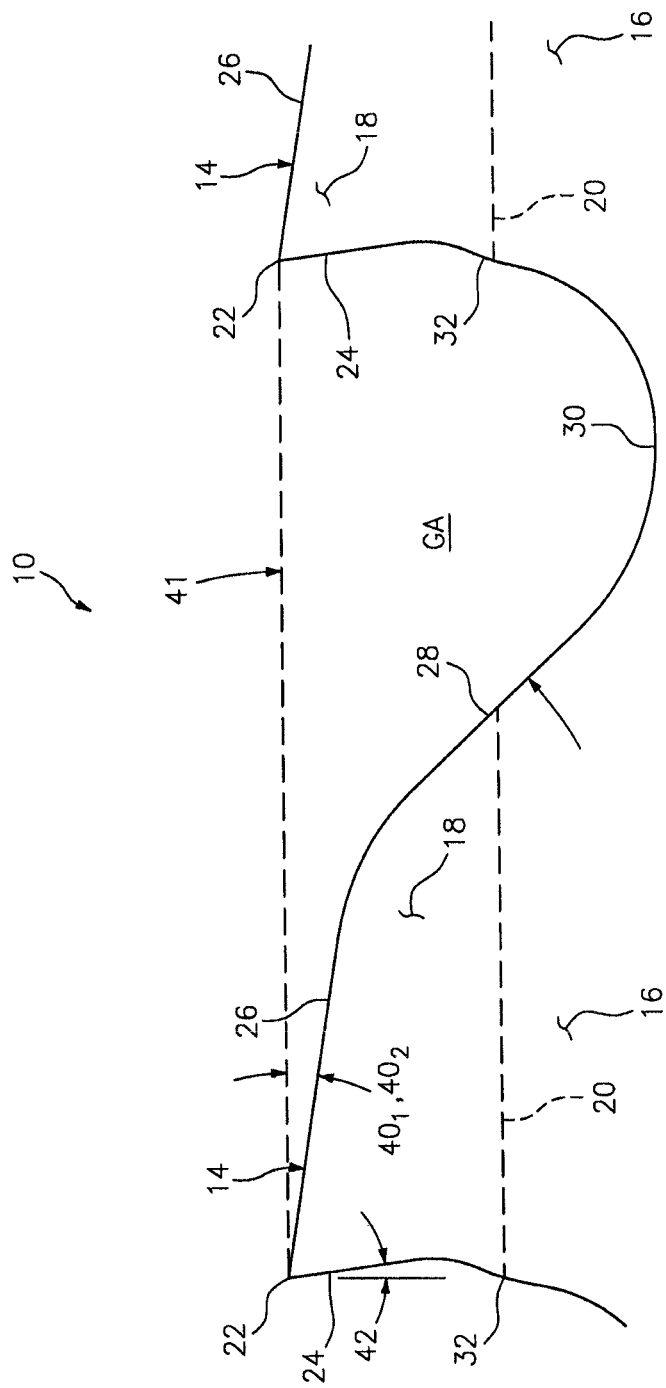
FIG. 2 is an enlarged, partial, side elevational view of a cutting tooth of the band saw blade of FIG. 1.

In FIGS. 1 and 2, a band saw blade embodying the present invention is indicated generally by the reference numeral 10. The bade saw blade 10 comprises a blade body 12 and a cutting edge defined by a plurality of cutting teeth 14. In the illustrated embodiment, the band saw blade 10 is a bimetal blade including a relatively flexible spring steel backing 16 welded to a tool steel strip defining tool steel tips 18 on the teeth. As shown typically in broken lines in FIG. 2, a weld line 20 is formed between each tool steel cutting tip 18 and the spring steel backing 16.

As also shown typically in FIG. 2, each tooth includes a cutting tip 22, a rake face 24 located on one side of the tip, a primary clearance surface 26 located on an opposite side of the tip relative to the rake face, a secondary clearance surface 28 located on an opposite side of the primary clearance surface relative to the tip, a gullet 30 located on an opposite side of the secondary clearance surface 28 relative to the primary clearance surface 26, and a protrusion 32 overlying the weld line 20 and extending between the rake face 24 and gullet 30. The protrusion 32 may be the same as or substantially the same as any of the protrusions disclosed in commonly assigned U.S. Pat. No. 6,601,495 which is hereby expressly incorporated by reference in its entirety as part of the present disclosure.

In the illustrated embodiments, the cutting teeth 14 define variable pitch patterns, and variable set patterns within the pitch patterns. The pitch of a tooth is the distance between the tip of that tooth and the tip of a successive tooth, or the distance between another point on that tooth and the same point on the successive tooth. In the illustrated embodiment, each pitch pattern includes 10 teeth, and each tooth defines a respective pitch P1 through P10. However, as may be recognized by those of ordinary skill in the pertinent art based on the teachings herein, this number is exemplary, and may be changed a desired or otherwise required.

As shown in FIG. 1, the blade 10 defines a cutting direction 34, and the plurality of teeth define repeating set patterns within each pitch pattern. Within the first set pattern, the teeth (i) increase in set in a direction opposite the cutting direction from an unset tooth to a light set tooth to a heavy set tooth; and (ii) then decrease in set from a heavy set tooth to a light set tooth to an unset tooth. Then, in the second or repeated set pattern, the teeth (i) increase in set from the unset tooth to a light set tooth to another heavy set tooth; and (ii) decrease in set from a heavy set tooth to a light set tooth to another unset tooth. More specifically, as shown in FIG. 1, the blade 10 includes a first unset tooth (S) defining a pitch P1 followed in a direction opposite the cutting direction 34 by a second light set tooth set to the right (R) defining a second pitch P2, a third heavy set tooth set to the left (L(h)) defining a third pitch P3, a fourth heavy set tooth set to the right (R(h)) defining a fourth pitch P4, a fifth light set tooth set to the left (L) defining a fifth pitch P5, a sixth unset tooth (S) defining a pitch P6, a seventh light set tooth set to the right (R) defining a seventh pitch P7, an eighth heavy set tooth set to the left (L(h)) defining an eighth pitch P8, a ninth heavy set tooth set to the right (R(h)) defining a ninth pitch P9, and a tenth light set tooth set to the left (L) defining a tenth pitch P10.

Figure 3:
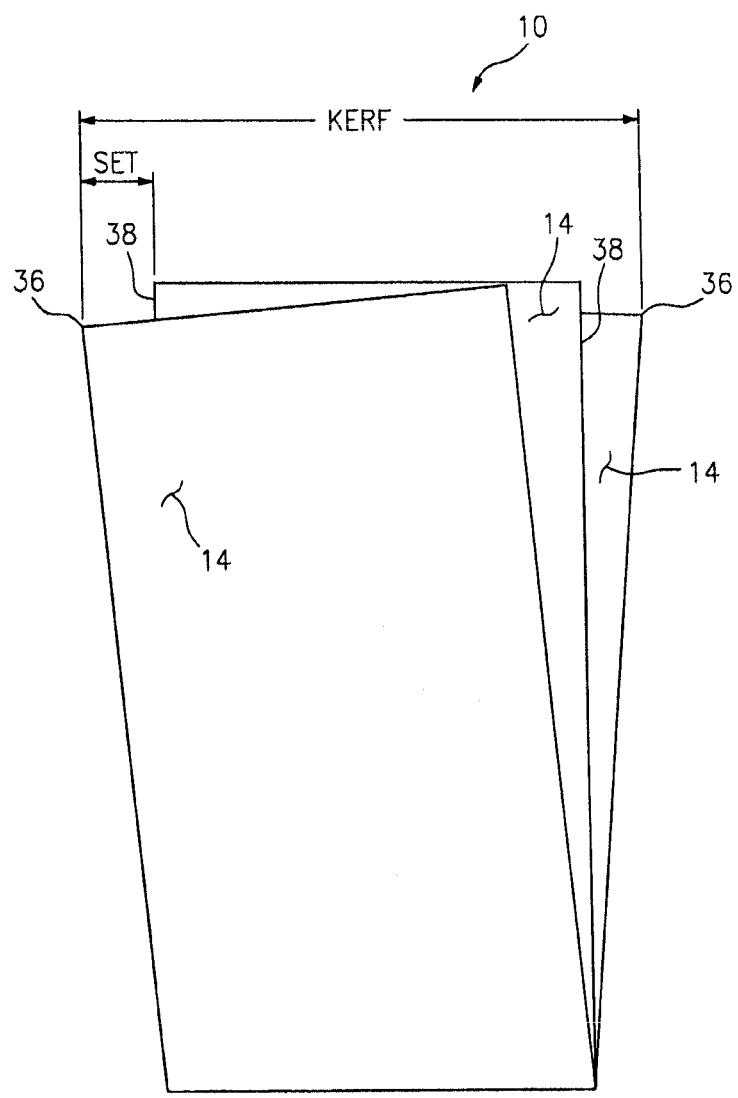
FIG. 3 is a partial, front elevational view of several cutting teeth of the band saw blade of FIG. 1 showing an unset tooth, and left and right set teeth on either side of the unset tooth.

As shown typically in FIG. 3, each set tooth defines a set equal to the distance between an outer edge 36 of the tooth and an adjacent side 38 of an unset tooth or the blade body 12. In the illustrated embodiments, each light set tooth ((L) and (R)) defines a set within the range of about 0.005 inch to about 0.007 inch, and preferably a set of about 0.006 inch, and each heavy set tooth ((L(h)) and (R(h))) defines a set within the range of about 0.008 inch to about 0.010 inch, and preferably a set of about 0.009 inch.

As shown typically in FIG. 2, each tooth defines a primary clearance angle 40 between the respective primary clearance surface 26 and a line or reference plane extending parallel to the elongated axis of the blade body or between the tips of successive unset teeth (S). Each heavy set tooth ((L(h)) and (R(h)) defines a first primary clearance angle $40_1$ and each unset tooth (S) and light set tooth ((L) and (R)) defines a second primary clearance angle $40_2$. Each first primary clearance angle $40_1$ is less than or equal to about 20°, each second primary clearance angle $40_2$ is less than or equal to about 25°, and each first primary clearance angle $40_1$ is within the range of about 4° to about 6° less than each second primary clearance angle $40_2$. Each tooth also defines a secondary clearance angle 41 between the respective secondary clearance surface 28 and a line or reference plane extending parallel to the elongated axis of the blade body or between the tips of successive unset teeth (S). In the illustrated embodiments, each secondary clearance angle is within the range of 42° to about 52°, and is preferably within the range of about 44° to about 50°. In the illustrated embodiments, each secondary clearance angle 41 is about 46½°. As shown typically in FIG. 1, each gullet defines a depth "D" which is the axial distance from the tip 22 of the tooth to the base of the gullet.

As shown typically in FIG. 2, each tooth defines a respective gullet area "GA" defined as the area below a line extending between the tips of successive teeth. Each unset (S) or light set tooth ((L) and (R)) defines (i) a greater gullet area GA than a respective heavy set tooth ((L(h)) and (R(h)), and/or (2) a finer pitch than the respective heavy set tooth. Each tooth 14 also defines a rake angle 42 which is the angle between the rake face 24 and an axis perpendicular to a reference plane, which may be defined by the plane extending between the tips of successive teeth having substantially the same height, such as successive unset teeth. A zero degree (0°) rake angle is aligned with the perpendicular axis, a negative rake angle extends forwardly relative to the perpendicular axis with respect to the cutting direction 34 of the blade, and a positive rake angle extends rearwardly relative to the perpendicular axis with respect to the cutting direction of the blade. Each tooth 14 defines a positive rake angle within the range of about 3° to about 10°. In the illustrated embodiments, each rake angle 42 is preferably greater than about 4°, is more preferably greater than about 6°, and is even more preferably greater than about 7°.

The currently preferred embodiments of the band saw blade define different variable pitch patterns. In the illustrated embodiments, each variable pitch pattern consists of teeth that decrease in pitch in a direction opposite the cutting direction 34, from a relatively coarse pitch to a relatively fine pitch, and then increase in pitch from the relatively fine pitch to a relatively coarse pitch. One embodiment defines a "⅝" variable pitch pattern, where the pitch varies within the range of about 5 teeth per inch ("TPI") to about 8 TPI; another embodiment defines a "6/10" variable pitch pattern, where the pitch varies within the range of about 6 TPI to about 10 TPI; and another embodiment defines a 10/14 pitch pattern, where the pitch varies within the range of about 10 TPI to about 14 TPI. In these embodiments, the primary clearance angles $40_1$ and $40_2$ vary such that the coarser pitch patterns define more shallow primary clearance angles than the finer pitch patterns. More specifically, (i) in the ⅝ variable pitch pattern embodiment, the first primary clearance angle $40_1$ is within the range of about 7° to about 11°, and is preferably about 9°, and the second primary clearance angle $40_2$ is within the range of about 13° to about 17°, and is preferably about 15°; (ii) in the 6/10 variable pitch pattern embodiment, the first primary clearance angle $40_1$ is within the range of about 10° to about 14°, and is preferably about 12°, and the second primary clearance angle $40_2$ is within the range of about 16° to about 20°, and is preferably about 18°; and (iii) in the 10/14 variable pitch pattern embodiment, the first primary clearance angle $40_1$ is within the range of about 17° to about 21°, and is preferably about 19°, and the second primary clearance angle $40_2$ is within the range of about 22° to about 25°, and is preferably about 24°.

In FIG. 4, the table illustrates the tooth type (i.e., (S), (R), (L), R(h) or L(h)), rake angle 42, primary clearance angle ($40_1$ or $40_2$), pitch (P1 through P10), and gullet area (GA), for the ten teeth (1-10) in each of the ⅝, 6/10 and 10/14 variable pitch pattern embodiments. As can be seen, in each embodiment, the pitch progressively decreases from one tooth to the next from a relatively coarse pitch to a relatively fine pitch, and then progressively increases in pitch from one tooth to the next from the relatively fine pitch to the relatively coarse pitch.

As shown in FIG. 4, in each of the ⅝, 6/10 and 10/14 variable pitch pattern embodiments, the gullet areas (GA) of the teeth decrease in a direction opposite the cutting direction 34 from a relatively high gullet area at one end of the respective pitch pattern to a relatively low gullet area in a midsection of the pitch pattern, and then increase from the relatively low gullet area to a relatively high gullet area at the other end of the pitch pattern. As also shown in FIG. 4, a plurality of teeth in a midsection of each pitch pattern (teeth nos. 5, 6 and 7) define (i) the finest pitches of the pitch pattern, and/or (ii) the smallest gullet areas of the pitch pattern. As can be seen, each of the three teeth at the midsection are either unset (S) or light set teeth ((L) or (R)). Also in each of these embodiments, the tooth defining (i) the smallest gullet area and (ii) the finest pitch, is an unset tooth (S) located in the midsection of the pitch pattern.

As also reflected in FIG. 4, each pitch pattern defines a total gullet area for all teeth within the respective pitch pattern. Preferably, (i) the total gullet area of all heavy set teeth is less than about 45% of the total gullet area of all teeth in the respective pitch pattern, and is more preferably less than about 40% of the total gullet area of all teeth in the respective pitch pattern; and (ii) the gullet area of each heavy set tooth is no more than about 12% of the total gullet area of all teeth in the respective pitch pattern, and is more preferably no more than about 9% of the total gullet area of all teeth in the respective pitch pattern. As shown typically in FIG. 4, one or more of the unset (S) or light set teeth ((L) or (R)) may define a lesser gullet area GA and a finer pitch than a respective heavy set tooth. In the illustrated embodiments, such unset or light set tooth is located in a midsection of the respective pitch pattern. Preferably, each of such one or more unset or light set teeth defines a gullet area that is not less than about 60 percent of the gullet area of any heavy set tooth, and preferably is within the range of about 50 percent to about 90 percent of the gullet area of any heavy set tooth.

Two types of band saw blades embodying the present invention were tested against several types of prior art band saw blades to assess (i) resistance to tooth damage, and (ii) performance as measured by the time required to cut through test work pieces ("time of cut"). In sum, as shown graphically in FIGS. 5 and 6, the band saw blades embodying the present invention significantly outperformed the prior art band saw blades with respect to both resistance to tooth damage and performance. All band saw blades were tested on the same manual pull-down type band saw and were used to cut the same types of test work pieces. The band saw was a MEP Shark 260, all tested blades were about 9 feet-1 inch×1 inch×0.035 inch. The guides on the band saw were spaced at about 10 inches, and the blade tension was maintained at about 60 bar. Each blade was tested for a maximum of 100 cuts with a 10 kg load hung from the band saw tensioning spindle. The test work pieces were "stuffed pipe" comprised of sections of #40 steel pipe with the following items welded at one end within the interior of the pipe: (i) a 2 inch×½ inch bar of 4140 alloy steel, (ii) a 1¼ inch×¼ inch bar of 304 stainless steel, (iii) 2 pieces of 1 inch×⅛ inch angle iron, and (iv) two pieces of #4 rebar. Each work piece was about 24 inches long and could be used for about eighty (80) test cuts. Due to the presence of stainless steel in the work pieces, the band saw was run at the "slow" speed of about 154 feet per minute. For each tested blade, the time for each cut through the work piece was measured. A maximum cut time of 150 seconds was adopted for the test, but due to previously observed variability in cut times believed to be due to machine "warm-up" and changes in work pieces, no blade was deemed to fail due to time out (i.e., failure to cut through a work piece prior to expiration of the 150 second maximum cut time) unless the 150 second maximum cut time was exceeded on two consecutive cuts for the respective blade.

Figure 5:
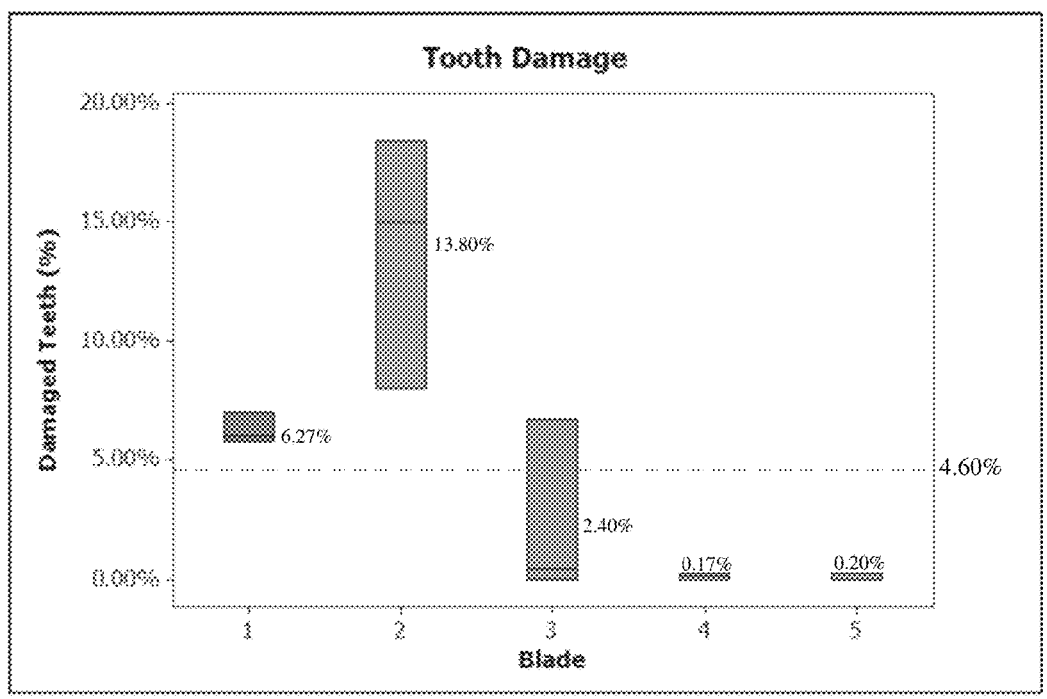
FIG. 5 is a graph illustrating the results of tests performed on embodiments of band saw blades of the present invention against several prior art band saw blades to assess their resistance to tooth damage.

In testing resistance to tooth damage, a "damaged" tooth was chipped or stripped. As shown in FIG. 5, less than 0.2 percent of the teeth of the tested band saw blades of the invention were damaged, whereas in the tested prior art blades, 6.27 percent, 13.8 percent, and 2.4 percent, of the teeth were damaged, respectively. Accordingly, the band saw blades of the invention demonstrated better than 10 times the tested resistance to tooth damage than the best tested prior art band saw blades.

Figure 6:
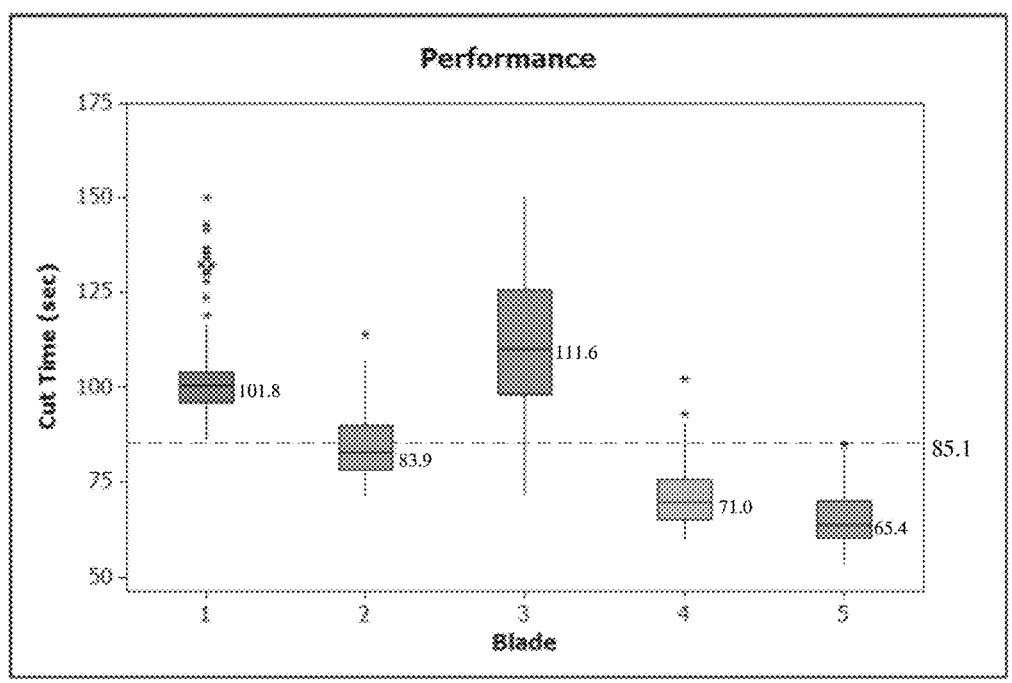
FIG. 6 is a graph illustrating the results of tests performed on embodiments of band saw blades of the present invention against several prior art band saw blades to assess their performance or time of cut.

With respect to speed of cut, the cut times for the tested band saw blades embodying the present invention were significantly faster, and thus they outperformed the tested prior art band saw blades. As shown in FIG. 6, the band saw blades embodying the invention were blade types 4 and 5. These blades had mean cut times of 71.03 and 65.37 seconds, respectively. The tested prior art blades (blade types 1, 2 and 3), on the other hand, had mean cut times of 104.33, 83.83 and 112.57 seconds, respectively. Accordingly, the tested band saw blades embodying the invention had significantly faster cut times than the tested prior art blades.

As can be seen from FIGS. 5 and 6, the tested band saw blades embodying the invention provide both significantly improved resistance to tooth damage and faster cut times than the tested prior art band saw blades. Further, no single tested prior art band saw blade provided a desired combination of both resistance to tooth damage and performance. For example, the best tested prior art band saw blade for resistance to tooth damage was blade type 3, but this blade type provided the poorest cut times of all tested blade types (FIG. 6). Similarly, the best tested prior art band saw blade for time of cut was blade type 2, but this blade type provided the poorest resistance to tooth damage of all tested blade types (FIG. 5).

FIG. 7 illustrates the features of each tested blade type. With respect to the nomenclature of FIG. 7, "Pitch (actual)" is the approximate pitch followed in parentheses by the measured or actual pitch; the "Average D/P" is the average depth "D" divided by the pitch "P"; "P. Relief" is the primary relief angle; "Min Band Width" is the minimum band width in inches; "T" is the number of teeth in the tooth pattern ("7T" is seven teeth in the tooth pattern, "8T" is eight teeth in the tooth pattern, and so on); and "Side Set" is the degree of set of the set teeth in inches. As can be seen, one key difference of the tested blades of the invention (blade types 4 and 5) as compared to the tested prior art blades (blade types 1, 2 and 3) is that the blades of the invention included primary clearance angles on the heavy set teeth (L(h) and R(h)) of 9°, and primary clearance angles on the unset and light set teeth ((S), (L) and (R)) of 15°. The present inventor determined that the more shallow the primary clearance angle, the better is the resistance of the blade to tooth damage, but that such shallow primary clearance angles could undesirably increase the time of cut. The present invention overcomes this dilemma and provides significant advantages neither taught nor suggested by the prior art by providing the most shallow primary clearance angles on only the heavy set teeth. As a result, the teeth most susceptible to tooth damage are significantly more robust and resistant to such damage, while nevertheless maintaining sufficient overall gullet volume (or gullet area) in the cutting teeth collectively to minimize or reduce the time of cut. These features, coupled with the relatively aggressive positive rake angles, allow the blades of the present invention to unexpectedly provide significant improvements with respect to both resistance to tooth damage and time of cut over prior art band saw blades, particularly when used on manual pull-down band saws to cut metal, structural work pieces. As also shown in FIG. 7, blade type 5 of the invention had a lesser degree of set, and thus a more narrow kerf, than blade type 4 of the invention. As a result, blade type 5 provided even faster performance (65.37 mean time of cut vs. 71.03 mean time of cut). This relatively narrow kerf unexpectedly did not result in the structural metal work pieces "springing back" and pinching the band saw blade.

As may be recognized by those of ordinary skill in the pertinent art based on the teachings herein, numerous changes and modifications may be made to the above-described and other embodiments of the present invention without departing from its scope as defined, for example, in the appended claims. For example, the teeth of the band saw blades may define any of numerous different tooth forms, pitch patterns or set patterns, or may be made of any of numerous different materials, that are currently known, or that later become known. In addition, the band saw blades of the invention can be used on band saws other than manual pull-down band saws, and can be used to cut work pieces other than structural metal work pieces. Although the disclosed embodiments of the invention are band saw blades, the features of the invention also could be employed in other types of saw blades, such as hole saws. Accordingly, this detailed description of embodiments is to be taken in an illustrative, as opposed to a limiting sense.

What is claimed is:

1. A band saw blade comprising a bi-metal blade body and a cutting edge defined by a plurality of cutting teeth with repeating pitch patterns and set patterns within pitch patterns, wherein:
   (i) at least one set pattern includes at least one unset or relatively light set tooth, and at least one relatively heavy set tooth;
   (ii) a plurality of teeth within the pitch pattern define different pitches;
   (iii) the at least one relatively heavy set tooth defines a heavy set tooth primary clearance angle, the at least one unset or relatively light set tooth defines an unset or relatively light set tooth primary clearance angle, each heavy set tooth primary clearance angle is less than or equal to 9°, each unset or relatively light set tooth primary clearance angle is less than or equal to 15°, and each heavy set tooth primary clearance angle is within the range of 4° to 6° less than each unset or relatively light set tooth primary clearance angle;
   (iv) each unset or relatively light set tooth defines at least one of (a) a greater gullet area than the at least one relatively heavy set tooth, and (b) a finer pitch than the respective relatively heavy set tooth; and
   (v) each tooth defines a positive rake angle within the range of 3° to 10°.

2. A band saw blade as defined in claim 1, wherein each tooth defines a positive rake angle that is greater than at least one of (i) 4°, (ii) 6°, and (iii) 7°.

3. A band saw blade as defined in claim 1, further comprising a blade body, wherein each relatively light set tooth and relatively heavy set tooth defines an offset equal to a distance between an outer edge of the tooth and an adjacent side edge of an unset tooth or the blade body, each relatively light set tooth defines an offset within the range of 0.005 to 0.007 inches, and each relatively heavy set tooth defines an offset within the range of 0.008 to 0.010 inches.

4. A band saw blade as defined in claim 1, wherein the band saw blade defines a cutting direction, and each pitch pattern comprises teeth that decrease in pitch in a direction opposite the cutting direction from a relatively coarse to a relatively fine pitch, and then increase in pitch from the relatively fine pitch to a relatively coarse pitch.

5. A band saw blade as defined in claim 4, further comprising a blade body, wherein each relatively light set tooth and relatively heavy set tooth defines an offset equal to a distance between an outer edge of the tooth and an adjacent side edge of an unset tooth or the blade body, and wherein the plurality of teeth define a first set pattern within the pitch pattern, and within the first set pattern the teeth (i) increase in offset in a direction opposite the cutting direction from an unset or relatively light set tooth to a relatively heavy set tooth, and (ii) decrease in offset from a relatively heavy set tooth to a relatively light set or unset tooth.

6. A band saw blade as defined in claim 5, wherein the plurality of teeth define a second set pattern that follows the first set pattern in a direction opposite the cutting direction of the blade within each pitch pattern, and within the second set pattern the teeth (i) increase in offset in a direction opposite the cutting direction from an unset or relatively light set tooth to a relatively heavy set tooth, and (ii) decrease in offset from a relatively heavy set tooth to a relatively light set or unset tooth.

7. A band saw blade as defined in claim 6, wherein the teeth in each of the first and second set patterns include an unset tooth followed in a direction opposite the cutting direction by a relatively light set tooth, a relatively heavy set tooth, another relatively heavy set tooth, and then a relatively light set tooth.

8. A band saw blade as defined in claim 6, wherein each set pattern includes an unset tooth followed in a direction opposite the cutting direction by a relatively light set tooth offset to a first side of the blade body, a relatively heavy set tooth offset to a second side of the blade body opposite the first side, a relatively heavy set tooth offset to the first side, a relatively light set tooth offset to the second side, an unset tooth or relatively light set tooth, a relatively light set tooth offset to the first side, a relatively heavy set tooth offset to the second side, a relatively heavy set tooth offset to the first side, and an unset or relatively light set tooth.

9. A band saw blade as defined in claim 1, wherein each pitch pattern comprises teeth that progressively decrease in pitch from one tooth to the next from a relatively coarse pitch to a relatively fine pitch, and then progressively increase in pitch from one tooth to the next from the relatively fine pitch to a relatively coarse pitch.

10. A band saw blade as defined in claim 1, wherein each pitch pattern defines a variable pitch within the range of 5 TPI to 8 TPI, the heavy set tooth primary clearance angle is 9°, and the unset or relatively light set tooth primary clearance angle is 15°.

11. A band saw blade as defined in claim 1, wherein each pitch pattern defines a total gullet area for all teeth within the respective pitch pattern, and the total gullet area of the relatively heavy set teeth is at least one of (i) less than 45% of the total gullet area of all teeth in the respective pitch pattern, and (ii) less than 40% of the total gullet area of all teeth in the respective pitch pattern.

12. A band saw blade as defined in claim 1, wherein the band saw blade defines a cutting direction, and the gullet areas of the teeth in each pitch pattern decrease in a direction opposite the cutting direction from a relatively high gullet area at one end of the pitch pattern to a relatively low gullet area in a mid-portion of the pitch pattern, and then increases from the relatively low gullet area to a relatively high gullet area at another end of the pitch pattern.

13. A band saw blade as defined in claim 1, wherein a plurality of teeth in a midsection of each pitch pattern define at least one of (i) the finest pitches of the pitch pattern, and (ii) the smallest gullet areas of the pitch pattern.

14. A band saw blade as defined in claim 13, wherein each pitch pattern includes ten teeth, and includes three teeth at the midsection of the pitch pattern defining at least one of (i) the finest pitches of the pitch pattern, and (ii) the smallest gullet areas of the pitch pattern.

15. A band saw blade as defined in claim 14, wherein each of said three teeth are either unset or relatively light set teeth.

16. A band saw blade as defined in claim 1, wherein the tooth of each pitch pattern defining at least one of (i) the smallest gullet area, and (ii) the finest pitch, is an unset tooth.

17. A band saw blade as defined in claim 1, wherein at least one unset or relatively light set tooth defines a lesser gullet area and a finer pitch than the relatively heavy set tooth.

18. A band saw blade as defined in claim 17, wherein said at least one unset or relatively light set tooth is located in a midsection of the respective pitch pattern.

19. A band saw blade as defined in claim 17, wherein said at least one unset or relatively light set tooth defines a gullet area that is not less than 60 percent of the gullet area of the respective relatively heavy set tooth.

20. A band saw blade as defined in claim 19, wherein said at least one unset or relatively light set tooth defines a gullet area that is within the range of 50 percent to 90 percent of the gullet area of the respective relatively heavy set tooth.

21. A band saw blade as defined in claim 1, further comprising a blade body including a relatively flexible backing, a relatively hard portion defining the tips of the cutting teeth welded to the backing, and a weld region therebetween welding the hard portion to the backing, and wherein each tooth includes a cutting tip, a gullet extending between the tooth and an adjacent tooth, a protrusion located at the weld region between the gullet and the tip, and a rake face extending between the protrusion and the cutting tip, wherein the protrusion extends outwardly relative to contiguous portions of the rake face and gullet.

22. A band saw blade comprising a bi-metal blade body and a cutting edge defined by a plurality of cutting teeth with repeating pitch patterns and set patterns within pitch patterns, wherein:
   (i) at least one set pattern includes at least one unset or relatively light set tooth, and at least one relatively heavy set tooth;
   (ii) a plurality of teeth within the pitch pattern define different pitches than a plurality of other teeth within the pitch pattern;
   (iii) the at least one relatively heavy set tooth defines a heavy set tooth primary clearance angle, the at least one unset or relatively light set tooth defines an unset or relatively light set tooth primary clearance angle, each heavy set tooth primary clearance angle is less than or equal to 9°, each unset or relatively light set tooth primary clearance angle is less than or equal to 15°;
   (iv) each tooth defines a positive rake angle within the range of 3° to 10°;
   (v) each tooth includes first means for preventing tooth chipping and stripping, wherein the first means is defined by each heavy set tooth primary clearance angle being within the range of 4° to 6° less than each unset or relatively light set tooth primary clearance angle; and
   (vi) each tooth includes second means for preventing gullet overfill and associated blade stall and crooked cutting.

23. A band saw blade as defined in claim 22, wherein the second means is defined by the at least one unset or relatively light set tooth defining at least one of (a) a greater gullet area than a respective relatively heavy set tooth, and (b) a finer pitch than the respective relatively heavy set tooth.

* * * * *